(No Model.)

F. L. STEWART.
WEIGHING SCALE.

No. 538,981. Patented May 7, 1895.

Witnesses:
Geo. E. Shafer
C. D. Sharrow

Inventor.
Frank L. Stewart
By Ithiel J. Cilley
Attorney.

UNITED STATES PATENT OFFICE.

FRANK L. STEWART, OF GRAND RAPIDS, MICHIGAN, ASSIGNOR OF ONE-HALF TO WILLIAM T. LAMOREAUX AND ALLEN P. COLLAR, OF SAME PLACE.

WEIGHING-SCALE.

SPECIFICATION forming part of Letters Patent No. 538,981, dated May 7, 1895.

Application filed October 24, 1894. Serial No. 526,894. (No model.)

*To all whom it may concern:*

Be it known that I, FRANK L. STEWART, a citizen of the United States, residing at Grand Rapids, in the county of Kent and State of Michigan, have invented certain new and useful Improvements in Weighing-Scales, of which the following is a specification.

My invention relates to improvements in scales for use in weighing meat, and other small articles, and its objects are, first, to provide a scale having a weighing dial and computing dial on the same plate; second, to provide for adjusting the hand to correspond with the units line on the dial or the variation of the spring when used on spring scales, and, third, to dispense with the use of an extra revolving hand in computing weighing scales. I attain these objects by the mechanism illustrated in the accompanying drawings, in which—

Figure 1:
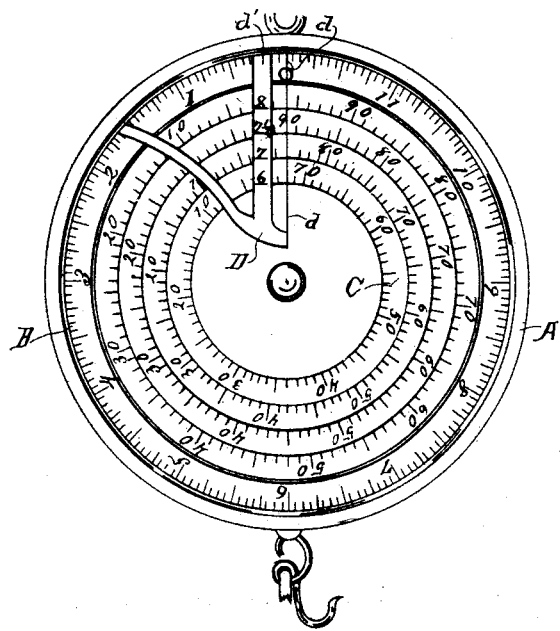
Figure 2:
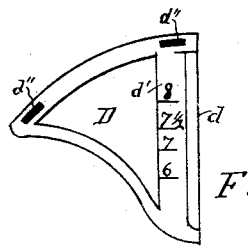

Figure 1 is a front elevation of my frame, dial, and hand. Fig. 2 is an elevation of the hand detached from the scales; and Fig. 3 is a vertical cross-section of the scale-frame, showing the manner of attaching the dial.

Similar letters refer to similar parts throughout the several views.

My dial is supported upon, and designed to turn with the shaft E as it is carried around by the weight of the article being weighed, and is provided with an outer circle of figures B denoting the number of pounds and ounces to be weighed as 1 2 3 4 5, &c., and a series of inner, concentric circles C that are divided into decimals and figured to compute the value, in dimes and cents, of any article weighed, at any given price per pound, as indicated by the figures 10 20 30 40 50, &c., and their subdivisions. Shown in Fig. 1. The price per pound is stamped upon a hand D having a main portion $d'$ upon which is stamped or printed, the price, as 5 6 7 8, &c., in position to correspond with the corresponding circle on the dial. In lieu of a pointer to mark the position at which the weighing and computing are fixed I form a fine line $d$ like the stretching of a fine wire upon the hand a short distance from the edge of the body $d'$, as shown in Fig. 1, in position to stand exactly over the weighing and computing figures or marks when the scales have settled to the weight of the article upon which weight and computation are desired. This hand is secured to the rim A, or the case F of the scales so that it is a fixture thereto, but may be adjusted to stand at the exact position desired, by means of the slots $d''$ upon the screws that secure it, in the usual way. With this form of hand I am enabled to leave the entire face of the dial open, so that I am enabled to mark my computing figures in tens instead of in units, and thus save a great deal of trouble, expense and confusion in making the dial and also in computing prices; and I have the advantage of having but one position to look at to ascertain both the weight and the price of the article being weighed. With this dial I can compute in whole numbers or fractions when the dial is properly arranged, as I have indicated at $6\frac{1}{2}$ on the hand, and the number of different prices that may be computed upon is limited, only, by the size of the dial and the number, and space of the concentric computing rings upon the face of the dial and the corresponding length of the hand and the index figures thereon.

Figure 3:
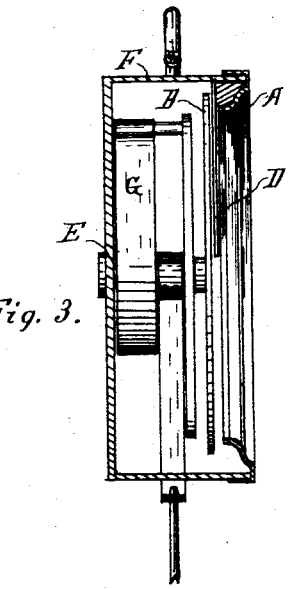

A glance at Fig. 3 will show that the dial is supported upon the center shaft of the scales, and is otherwise entirely detached from the frame of the scales so that its revolving motion is entirely free and unimpeded except by the tension of the actuating spring G, so that while the entire dial revolves, it is perfectly balanced, and its motion is as free and certain as is the motion of a revolving hand.

Having thus described my invention, what I claim as new is—

The combination in a weighing scale, of a revoluble dial having a series of concentric rings, the outer of said rings divided to compute pounds and ounces, and the balance divided and figured to compute the aggregate cost of the article weighed, at any given price per pound, and a hand having price marks to correspond with each of the several cost marks on the dial, said hand integral with, and supported by a segmental body having slots by means of which it is adjustably secured to the frame that supports the revoluble dial, a brace connecting said hand and adjustable body, and a fine reading line or wire attached to the hand and supported to radiate from the center to the periphery and directly over the units line of the dial when it is in its normal position, substantially as and for the purpose set forth.

Signed at Grand Rapids, Michigan, this 13th day of October, 1894.

FRANK L. STEWART.

In presence of—
GEO. E. SHAFER,
ITHIEL J. CILLEY.